United States Patent
Shi et al.

(10) Patent No.: US 8,559,915 B2
(45) Date of Patent: Oct. 15, 2013

(54) METHODS AND SYSTEMS FOR EMERGENCY CALL HANDLING WITH POSITION LOCATION OVER COMMUNICATION NETWORKS

(75) Inventors: Guangming Carl Shi, San Diego, CA (US); Wei Zhang, San Diego, CA (US); Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 347 days.

(21) Appl. No.: 12/405,231

(22) Filed: Mar. 17, 2009

(65) Prior Publication Data

US 2010/0124901 A1 May 20, 2010

Related U.S. Application Data

(60) Provisional application No. 61/115,016, filed on Nov. 14, 2008.

(51) Int. Cl.
| | |
|---|---|
| H04M 11/04 | (2006.01) |
| H04W 4/00 | (2009.01) |
| H04W 36/00 | (2009.01) |
| H04W 72/00 | (2009.01) |
| H04W 24/00 | (2009.01) |
| H04B 7/212 | (2006.01) |

(52) U.S. Cl.
USPC ............. 455/404.2; 455/438; 455/435.1; 455/450; 455/452.2; 455/456.6; 370/341; 370/348; 370/331; 370/329; 370/328

(58) Field of Classification Search
USPC .......... 455/411, 436–444, 456.1–456.6, 457, 455/458, 466; 370/389, 395.4, 395.42, 370/395.43, 395.5, 442–444; 342/450–465, 342/126, 357.55; 340/6.1, 7.1
See application file for complete search history.

(56) References Cited

U.S. PATENT DOCUMENTS

| 6,600,914 B2 | 7/2003 | Uhlik et al. | |
|---|---|---|---|
| 8,364,114 B2 * | 1/2013 | Li et al. | 455/404.1 |
| 2002/0065063 A1 | 5/2002 | Uhlik et al. | |
| 2005/0112488 A1 | 5/2005 | Yamada et al. | |

(Continued)

FOREIGN PATENT DOCUMENTS

| EP | 1024676 | 8/2000 |
|---|---|---|
| EP | 1439725 | 7/2004 |

(Continued)

OTHER PUBLICATIONS

Research on Bandwidth Reservation in IEEE 802.16 (WiMAX) Networks—Yi Sun, Yilin Song, Jinglin Shi and Eryk Dutkiewicz Proceedings of the 2007 IEEE International Conference on Telecommunications and Malaysia International Conference on Communications, May 14-17, 2007, Penang, Malaysia.*

(Continued)

*Primary Examiner* — Dwayne Bost
*Assistant Examiner* — Nalini Mummalaneni
(74) *Attorney, Agent, or Firm* — Tyler J. Overall

(57) ABSTRACT

Certain embodiments of the present disclosure relate to methods for handling an emergency call along with its position location in the WiMAX network, and for performing a handover of the emergency call for a multi-mode mobile station that supports multiple wireless standards.

36 Claims, 9 Drawing Sheets

(56) References Cited

U.S. PATENT DOCUMENTS

2007/0258407 A1* 11/2007 Li et al. .................. 370/331
2009/0207791 A1 8/2009 Nakatsugawa
2010/0124899 A1 5/2010 Shi et al.

FOREIGN PATENT DOCUMENTS

| TW | 200605567 | | 2/2006 |
| --- | --- | --- | --- |
| TW | M288740 | | 3/2006 |
| TW | 201019759 | A | 5/2010 |
| WO | WO 2005112488 | | 11/2005 |
| WO | WO 2005112488 | A2 * | 11/2005 |
| WO | WO 2006107701 | | 10/2006 |
| WO | WO 2008093218 | | 8/2008 |
| WO | WO 2008093218 | A2 * | 8/2008 |
| WO | WO 2008133450 | A1 * | 11/2008 |

OTHER PUBLICATIONS

3GPP: "3rd Generation Partnership Project; Technical Specification Group Services and System Aspects; IP Multimedia Subsystem (IMS) emergency sessions (Release 8)," 3GPP TS 23.167, v.8.1.0, (Sep. 1, 2008), XP002548691.
IEEE Wireless Man 802.16: "DRAFT—Standard for Local and metropolitan area networks Part 16: Air Interface for Broadband Wireless Access Systems," P802.16REV2/D7, (Oct. 1, 2008), XP002549937, paragraph [6.2.3.6] paragraph [6.3.8.1] paragraph [6.3.10] paragraph [8.4.5.4] paragraph [11.5]—paragraph [11.6].
International Search Report—PCT/US2009/045618, International Search Authority—European Patent Office—Feb. 5, 2010.
Nguyen-Vuong, Quoc-Thinh et al.: "Terminal-Controlled Mobility Management in Heterogeneous Wireless Networks," IEEE Communications Magazine, Piscataway, USA, vol. 45, No. 4, (Apr. 1, 2007), pp. 122-129, XP011176569, ISSN: 0163-6804.
Partial International Search Report—PCT/US2009/045618, International Search Authority—European Patent Office—Oct. 28, 2009.
International Preliminary Report on Patentability—PCT/US09/045618, The International Bureau of WIPO—Geneva, Switzerland, Feb. 9, 2011.
Written Opinion—PCT/US2009/045618, International Search Authority, European Patent Office, Feb. 5, 2010.
P802.16Rev2/D2 (Dec. 2007) Draft Standard for Local and metropolitan area networks Part 16: Air Interface for Broadband Wireless Access Systems.
Taiwan Search Report—TW098117868—TIPO—Aug. 16, 2012.

\* cited by examiner

METHODS AND SYSTEMS FOR EMERGENCY CALL HANDLING WITH POSITION LOCATION OVER COMMUNICATION NETWORKS

CLAIM OF PRIORITY

The present Application for Patent claims benefit of Provisional Patent Application Ser. No. 61/115,016 EMERGENCY CALL HANDLING WITH POSITION LOCATION OVER WIMAX NETWORKS AND WIMAX/3G HANDOVER filed Nov. 14, 2008, and assigned to the assignee hereof and hereby expressly incorporated by reference herein.

TECHNICAL FIELD

Certain embodiments of the present disclosure generally relates to wireless communication systems and more specifically to emergency calls.

SUMMARY

Certain embodiments provide a method of wireless communications. The method can include receiving a ranging request message from a mobile station (MS) with an emergency call identification, setting up the emergency call, and determining a location of the emergency call based on Global Positioning System (GPS) location information received from the MS.

Certain embodiments provide a method of wireless communications. The method can include requesting a handover during an emergency call, performing a Worldwide Interoperability for Microwave Access (WiMAX) handover procedure if the requested handover is from a serving base station (BS) of the WiMAX network to a target BS of the WiMAX network, and performing a WiMAX handover procedure and a 3rd Generation/2nd Generation (3G/2G) voice call handover procedure if the requested handover is from a serving BS of the WiMAX network to a target BS of the 3G/2G network.

Certain embodiments provide an apparatus for wireless communications. The apparatus can include logic for receiving a ranging request message from a MS with an emergency call identification, logic for setting up the emergency call, and logic for determining a location of the emergency call based on Global Positioning System (GPS) location information received from the MS.

Certain embodiments provide an apparatus for wireless communications. The apparatus can include logic for requesting a handover during an emergency call, logic for performing a Worldwide Interoperability for Microwave Access (WiMAX) handover procedure if the requested handover is from a serving base station (BS) of the WiMAX network to a target BS of the WiMAX network, and logic for performing a WiMAX handover procedure and a 3rd Generation/2nd Generation (3G/2G) voice call handover procedure if the requested handover is from a serving BS of the WiMAX network to a target BS of the 3G/2G network.

Certain embodiments provide an apparatus for wireless communications. The apparatus can include means for receiving a ranging request message from a mobile station (MS) with an emergency call identification, means for setting up the emergency call, and means for determining a location of the emergency call based on Global Positioning System (GPS) location information received from the MS.

Certain embodiments provide an apparatus for wireless communications. The apparatus can include means for requesting a handover during an emergency call, means for performing a Worldwide Interoperability for Microwave Access (WiMAX) handover procedure if the requested handover is from a serving base station (BS) of the WiMAX network to a target BS of the WiMAX network, and means for performing a WiMAX handover procedure and a 3rd Generation/2nd Generation (3G/2G) voice call handover procedure if the requested handover is from a serving BS of the WiMAX network to a target BS of the 3G/2G network.

Certain embodiments provide a computer-program product for wireless communications, including a computer readable medium having instructions stored thereon, the instructions being executable by one or more processors. The instructions can include instructions for receiving a ranging request message from a mobile station (MS) with an emergency call identification, instructions for setting up the emergency call, and instructions for determining a location of the emergency call based on Global Positioning System (GPS) location information received from the MS.

Certain embodiments provide a computer-program product for wireless communications, including a computer readable medium having instructions stored thereon, the instructions being executable by one or more processors. The instructions can include instructions for requesting a handover during an emergency call, instructions for performing a Worldwide Interoperability for Microwave Access (WiMAX) handover procedure if the requested handover is from a serving base station (BS) of the WiMAX network to a target BS of the WiMAX network, and instructions for performing a WiMAX handover procedure and a 3rd Generation/2nd Generation (3G/2G) voice call handover procedure if the requested handover is from a serving BS of the WiMAX network to a target BS of the 3G/2G network.

In certain embodiments, as presented in the summary paragraphs above and elsewhere within this disclosure, the MS can be configured for operation in a wireless communication system that supports an Institute of Electronic and Electrical Engineers (IEEE) 802.16 standard.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.

In Worldwide Interoperability for Microwave Access (WiMAX) networks, it may be required that emergency phone calls are handled while their network locations need to be fully determined. A position location for an emergency call may be mandatory. For example, the E911 emergency call with mandatory position location is specified per Federal Communications Commission (FCC) regulations. Furthermore, in multi-mode wireless systems that support more than one standard, it may be necessary to support a handover of the emergency call between, for example, the WiMAX network and the 3rd Generation (3G) network.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. These standards define at least four different physical layers (PHYs) and one medium access control (MAC) layer. The OFDM and OFDMA physical layer of the four physical layers are the most popular in the fixed and mobile BWA areas respectively.

Figure 1:
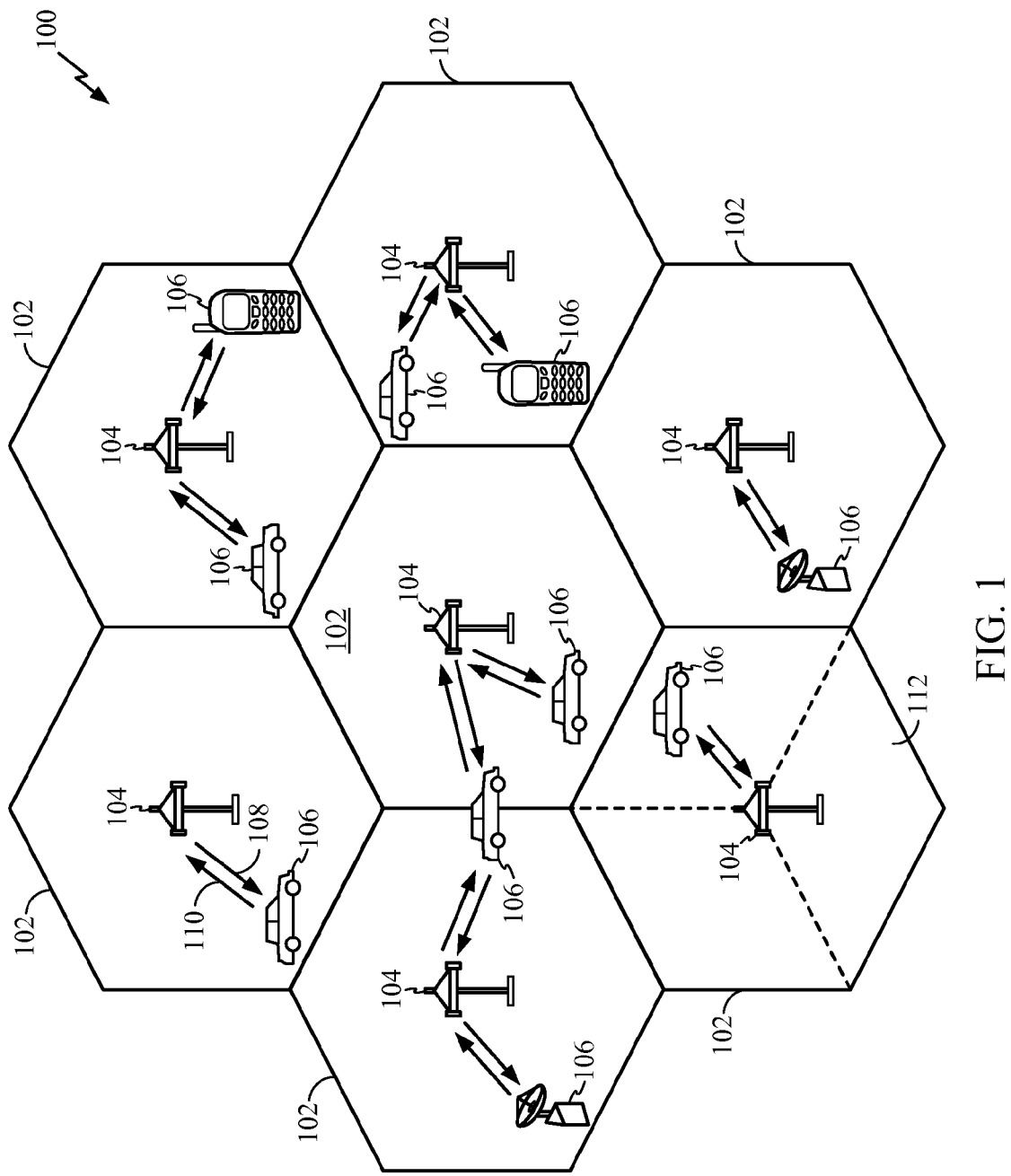
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system (also noted herein as "OFDM/A").

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
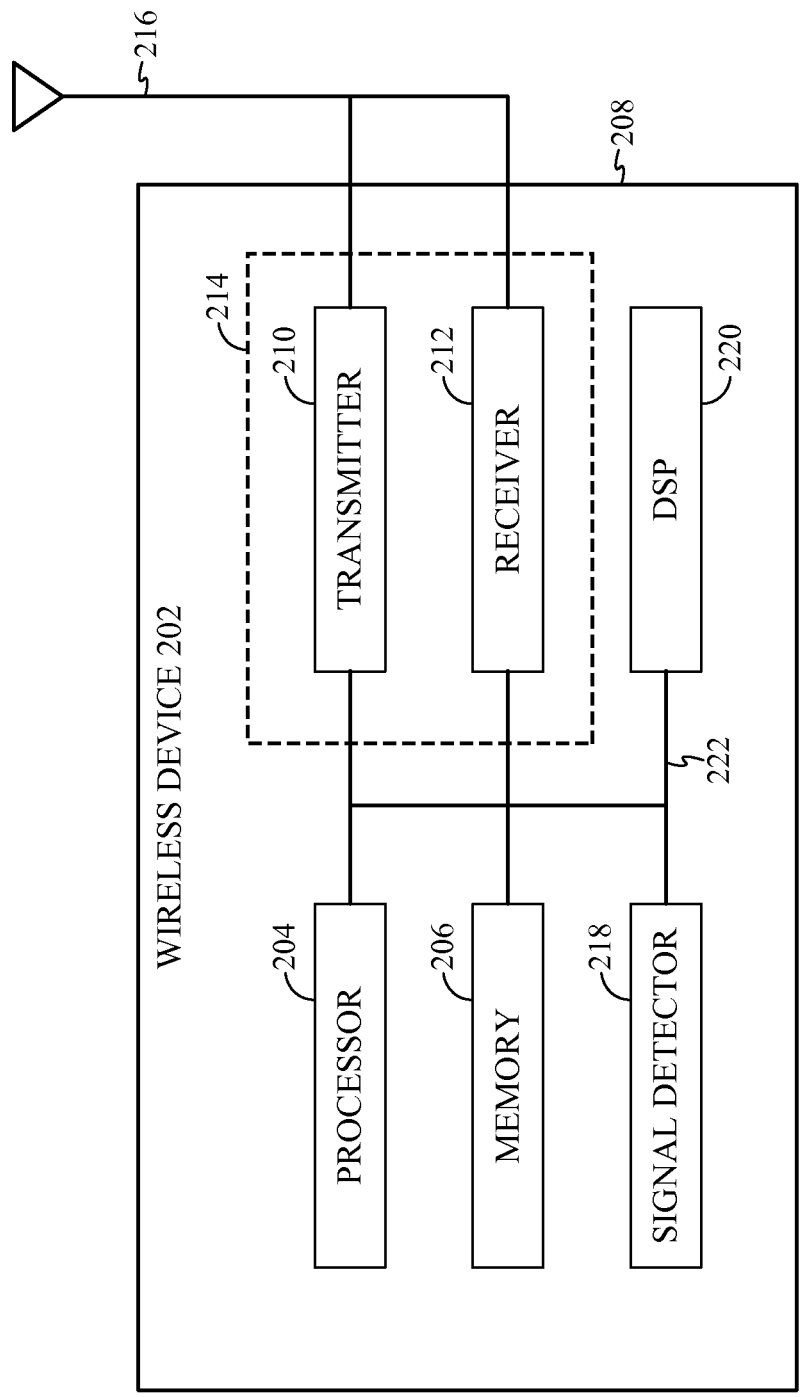
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
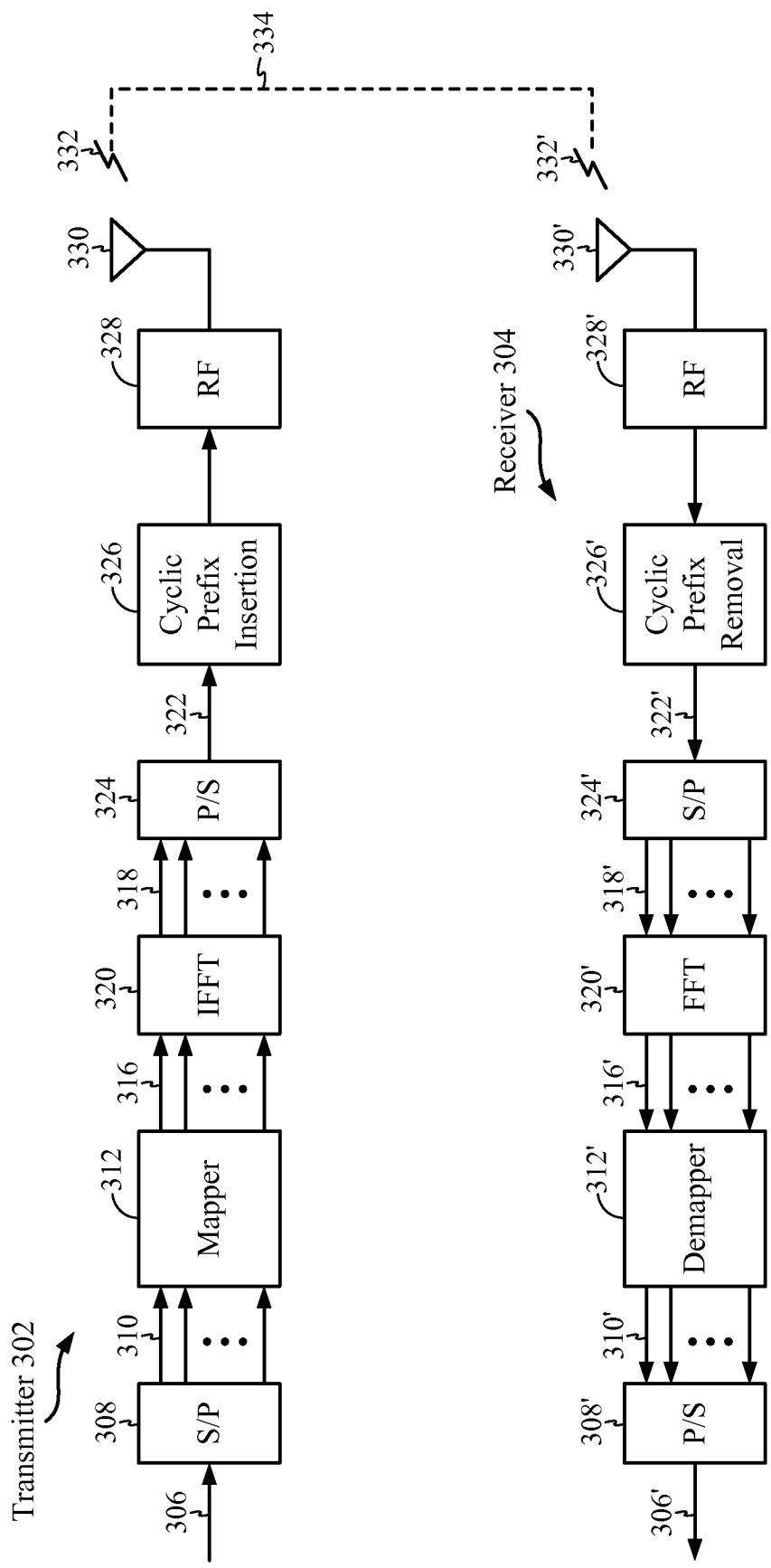
FIG. 3 illustrates an example transmitter and an example receiver that may be used within a wireless communication system in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 1 10.

Data 306 to be transmitted is shown being provided as input to a serial-to-parallel (S/P) converter 308. The S/P converter 308 may split the transmission data into M parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, NS, is equal to NCP (the number of cyclic prefix (CP) samples per OFDM symbol)+N (the number of useful samples per OFDM symbol).

The N parallel time domain sample streams 318 may be converted into an OFDM/A symbol stream 322 by a parallel-to-serial (P/S) converter 324. A cyclic prefix insertion component 326 may insert a CP between successive OFDM/A symbols in the OFDM/A symbol stream 322. The output of the CP insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A CP removal component 326' may then remove the CP that was inserted between OFDM/OFDMA symbols by the CP insertion component 326.

The output of the CP removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found in a baseband processor 340'.

WiMAX systems, such as the one illustrated in FIG. 1, may be required to handle emergency calls, while network locations of emergency calls may need to be fully determined. Knowledge of location of an emergency call may be mandatory per FCC regulations, such as it is mandatory for the E911 emergency call. Furthermore, in multi-mode systems that support multiple wireless standards, handovers of emergency calls may be necessary. It may be required, e.g., to perform a handover of the emergency call between the WiMAX network and the 3rd Generation/2nd Generation (3G/2G) network for a multi-mode mobile station. Certain embodiments of the present disclosure relate to methods for handling the emergency call along with its position location in the WiMAX network, as well as to methods for performing a handover of the emergency call from to a base station that supports the same or different standards.

Exemplary Emergency Call Set-up and Location Update

Figure 4:
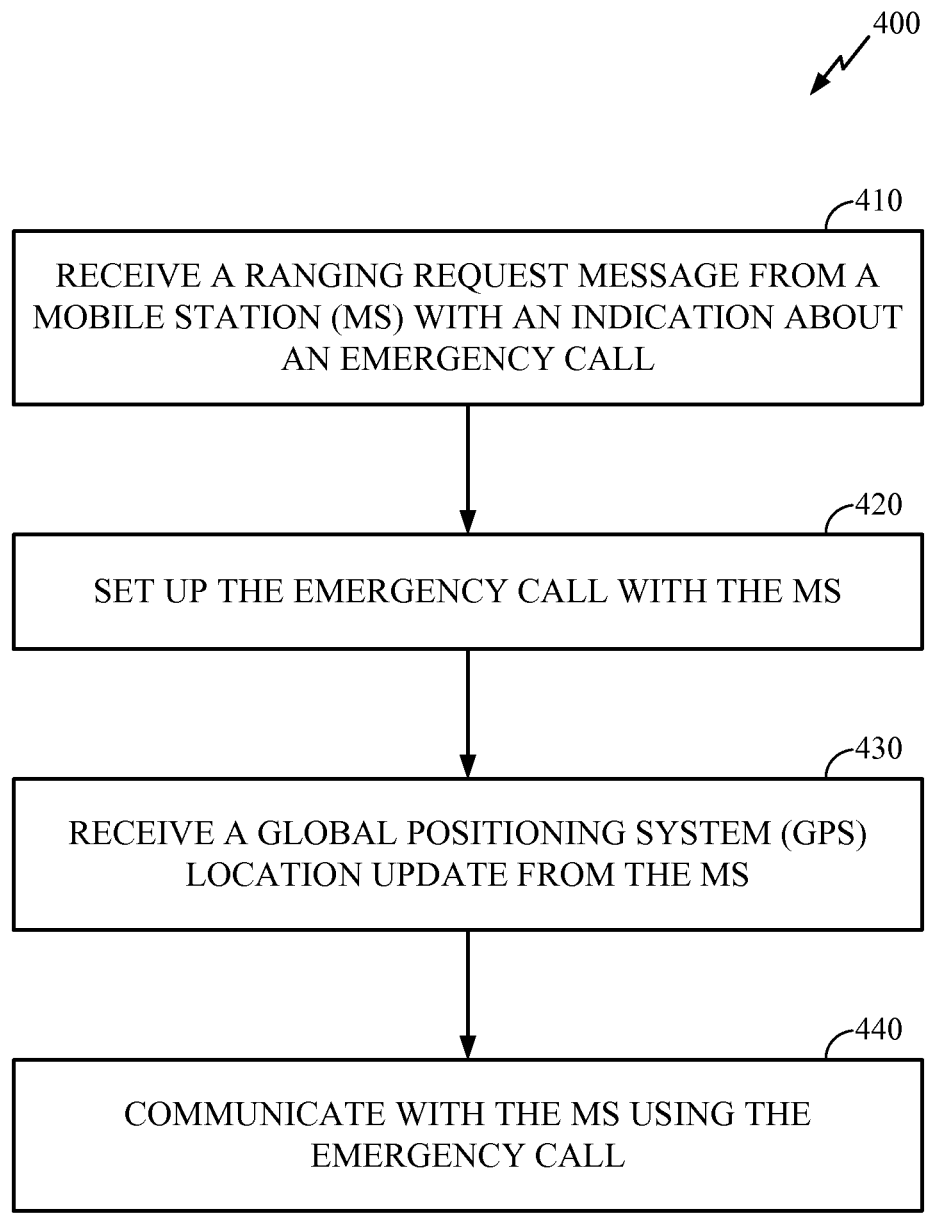
FIG. 4 illustrates example operations for setting up an emergency call and for determining its position location over the WiMAX network in accordance with certain embodiments of the present disclosure.

FIG. 4 illustrates example operations 400 for setting up an emergency call and for determining position location of an MS placing the call over the WiMAX network. The operations begin, at 410, with a mobile station (MS) sending a ranging request (RNG-REQ) message to a base station (BS) with an indication about the emergency call. The emergency call may be indicated using a special bit within a Ranging Purpose Indicator field of the RNG-REQ message.

At 420, the emergency call may be set up by the serving BS. For certain embodiments of the present disclosure the serving BS may initiate the emergency call over a Voice over Internet Protocol (VoIP). If the served MS is in an idle mode, then the BS may page the MS before setting up the emergency call. On the other hand, if the MS have already used some traffic connections, then the BS may send a Dynamic Service Addition (DSA) message to the MS in order to initiate the emergency call.

For certain embodiments of the present disclosure, the MS may initiate the emergency call through a regular data call, but with a new Quality of Service (QoS) emergency call parameter. For certain embodiments of the present disclosure, the MS may initiate the emergency call over the VoIP after a ranging procedure with the serving BS. An average time spent in the ranging procedure for emergency calls may need to be smaller than for regular calls. For example, the average waiting time may be decreased if the MS is allowed to utilize multiple Transmission Opportunities (TOs) within the same frame or within adjacent frames in order to increase a probability of successful ranging with the serving BS. The number of TOs may be adjusted based upon a current ranging traffic condition of the serving BS. The probability of successful ranging with the serving BS for the emergency call may be also increased if a transmission power for sending Code Division Multiple Access (CDMA) ranging codes is increased by some emergency weight factor that may be determined, for example, by a network operator.

In order to speed up the emergency call procedure, the setup of the emergency call may bypass an authentication procedure. Furthermore, the setup for the emergency call may not require the MS to be registered with any BS or even to be provisioned (e.g., in the case of the first purchase of the MS without signing up with any provider, in the case of loss or corruption of provisioning information, etc). The authentication procedure may be re-performed once the emergency service between an emergency call center and the MS is established. The purpose of re-performing the authentication procedure may be to upgrade a basic emergency service application (e.g., a voice call or a simple text message) to an advanced emergency service application that requires a larger bandwidth (e.g., an emergency application that simultaneously supports both voice and data).

Following the emergency call setup or in the same time with the emergency call setup, the serving BS may receive, at 430, Global Positioning System (GPS) location information from the MS. Based on the received GPS information, the BS may determine a network location of the emergency call. The BS may send a GPS location request either once or periodically, and the MS may respond with its GPS location information. Once the GPS information is received at the BS, the BS may also forward this information to the emergency call center.

As an alternative to (or in addition to) step 430, the MS may send the GPS location information periodically to the BS following the ranging procedure with the emergency call indication or after the emergency call setup. The BS may receive the GPS information and may send this information to the emergency call center. For certain embodiments of the present disclosure, the MS or the BS can set up the emergency GPS for a regular data call, and the emergency call center may exchange the emergency GPS information using an existing protocol over the WiMAX special data call or over the WiMAX regular data call. At 440, the serving BS may communicate over the WiMAX network with the MS using the established emergency call, while the location of the emergency call is known to the BS and to the emergency call center.

Exemplary Emergency Call Handover

Figure 5:
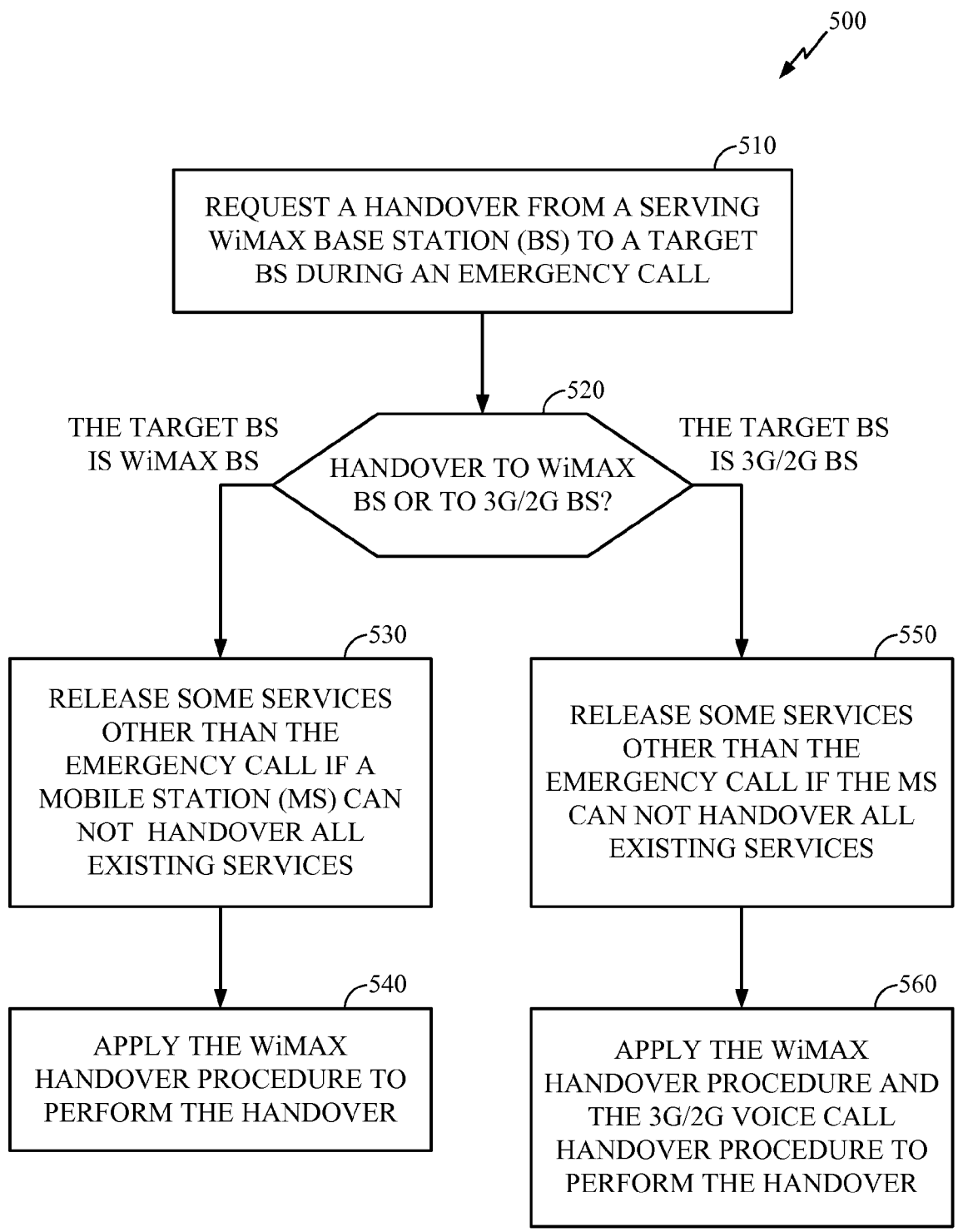
FIG. 5 illustrates example operations for performing a handover during the emergency call in accordance with certain embodiments of the present disclosure.

FIG. 5 illustrates example operations for performing a handover during an emergency VoIP call. The operations begin, at 510, with a multi-mode mobile station (MS) requesting a handover during a WiMAX emergency call. If the multimode MS needs to handover the emergency VoIP call from a serving WiMAX base station (BS) to a target WiMAX BS (which can be decided at 520), then the MS may apply a WiMAX handover procedure for performing a handover, at 540. Preceding the WiMAX handover procedure, at 530, the MS may release some services different than the emergency call service (e.g., a simultaneous VoIP call, an internet protocol television (IPTV) service, an internet browsing service, an e-mail service, etc) if the MS cannot handover all existing services.

On the other hand, if the multimode MS needs to handover the emergency VoIP call from a serving WiMAX BS to a target 3G/2G BS (which can be decided at 520), then the MS may apply the WiMAX handover procedure along with the 3G/2G voice call handover procedure for performing a handover, at 560. Preceding the handover of the emergency call from the serving WiMAX BS to the target 3G/2G BS, at 550, the MS may release some services different than the emergency call service (e.g., simultaneous VoIP call, IPTV service, internet-browsing service, email service, etc) if the MS cannot handover all existing services from one network to another.

Exemplary Priority Processing for Emergency Calls

Figure 6:
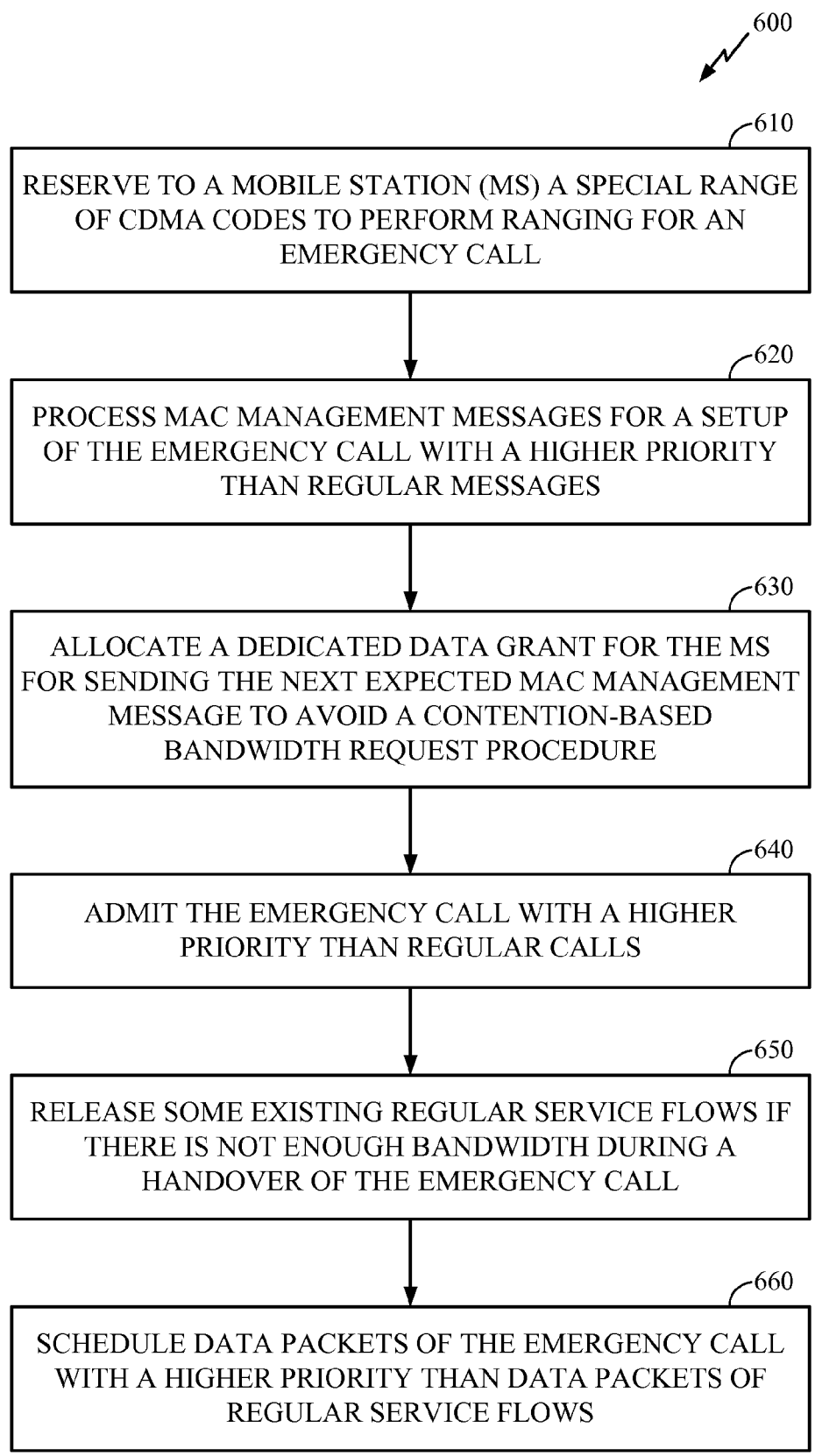
FIG. 6 illustrates example operations for priority processing for emergency calls in accordance with certain embodiments of the present disclosure.

For certain embodiments of the present disclosure, a serving BS may take measures to allow emergency calls to be prioritized. FIG. 6 illustrates example operations for priority processing applied in the case of emergency calls.

At 610, the BS may reserve a special range of CDMA codes to a served MS in order to perform ranging for the emergency call, and a random selection after collision may be utilized. If the MS cannot perform successful ranging by using the special ranging CDMA codes, then the MS may use the existing initial or handover ranging codes in order to perform ranging. In certain embodiments, instead of using a random number generator to select the CDMA code, some CDMA code may be reserved for an emergency call. In this way, the BS may get an early alert that a coming CDMA ranging code traffic from the MS could be related to the emergency call.

At 620, the BS may process Media Access Control (MAC) management messages for setting up the emergency call with a higher priority than for regular messages. Examples of MAC management messages for the emergency call setup are: a Paging Advertising (PAG-ADV) message, a Range Request (RNG-REQ) message, a Range Response (RNG-RSP) message, a Dynamic Service Addition Request (DSA-REQ) message, a Dynamic Service Addition Response (DSA-RSP) message, a Dynamic Service Addition Acknowledgement (DSA-ACK) message, etc.

At 630, the BS may allocate a dedicated data grant for the MS for sending the next expected MAC management message. For example, after receiving the RNG-RSP message, the BS may allocate the data grant for the MS for sending the DSA-REQ message, which may avoid a contention-based bandwidth request procedure.

At 640, the admission control of the BS may admit emergency calls with higher priority than regular calls. If the serving BS does not have enough bandwidth for all existing service flows at the MS, then some service flow(s) may be released. Moreover, at 650, a target BS may release some existing regular service flow(s) if there is not enough bandwidth during the handover of the emergency call from the currently serving BS to the target BS. At 660, data schedulers of the BS and of the MS may schedule data packets of the emergency call with a higher priority than data packets of other regular service flows.

Figure 4A:
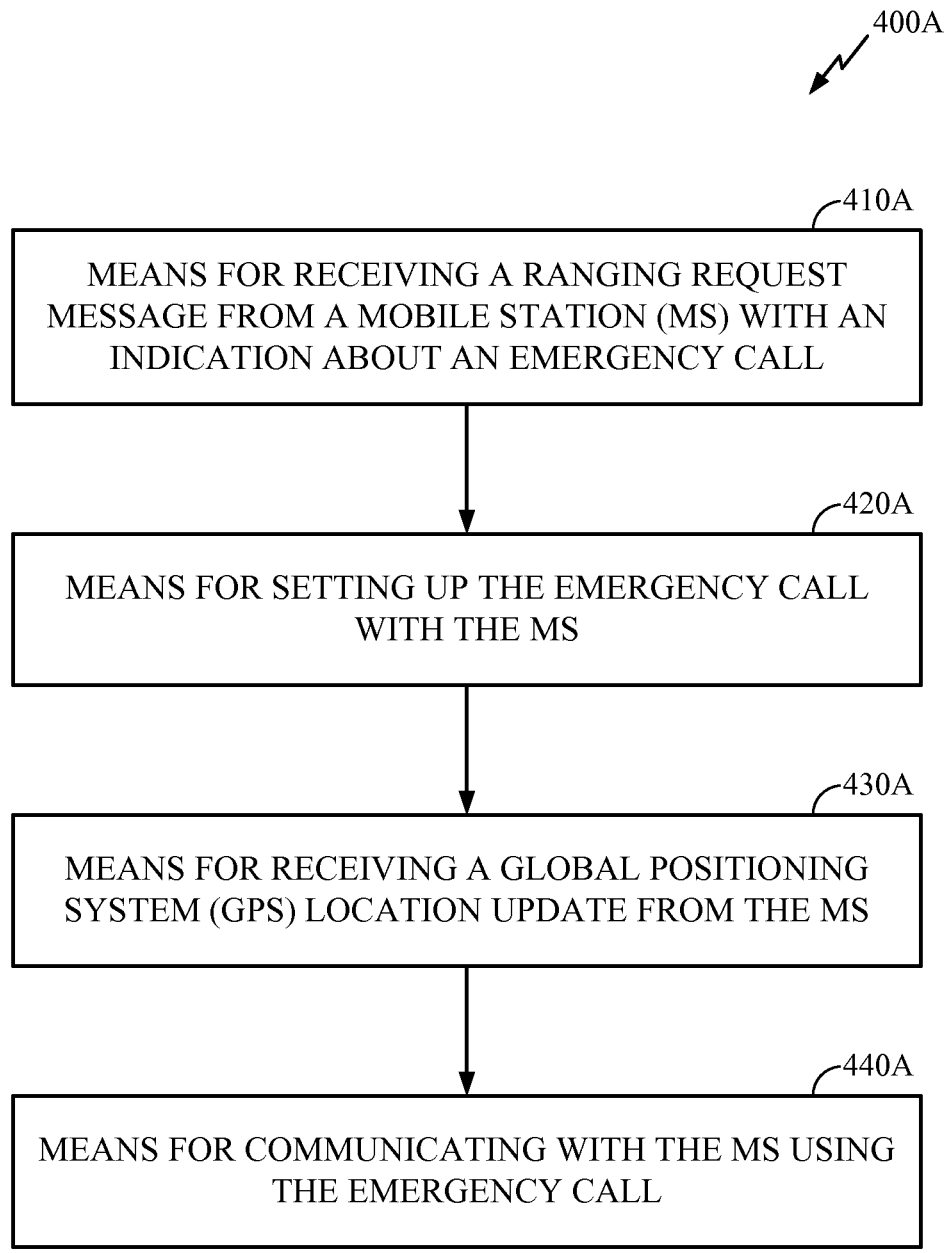
FIG. 4A illustrates example components capable of performing the operations illustrated in FIG. 4.
Figure 5A:
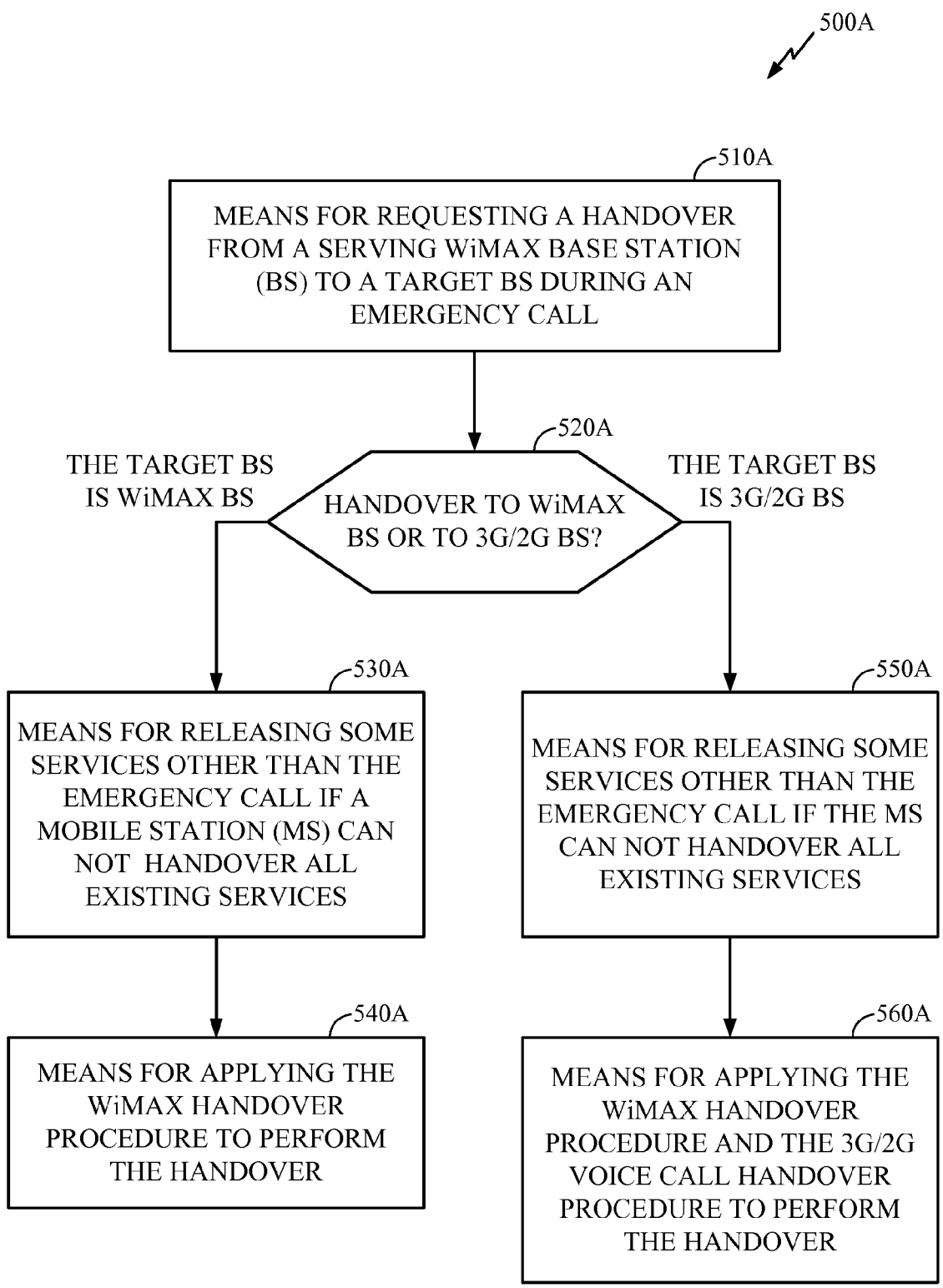
FIG. 5A illustrates example components capable of performing the operations illustrated in FIG. 5.
Figure 6A:
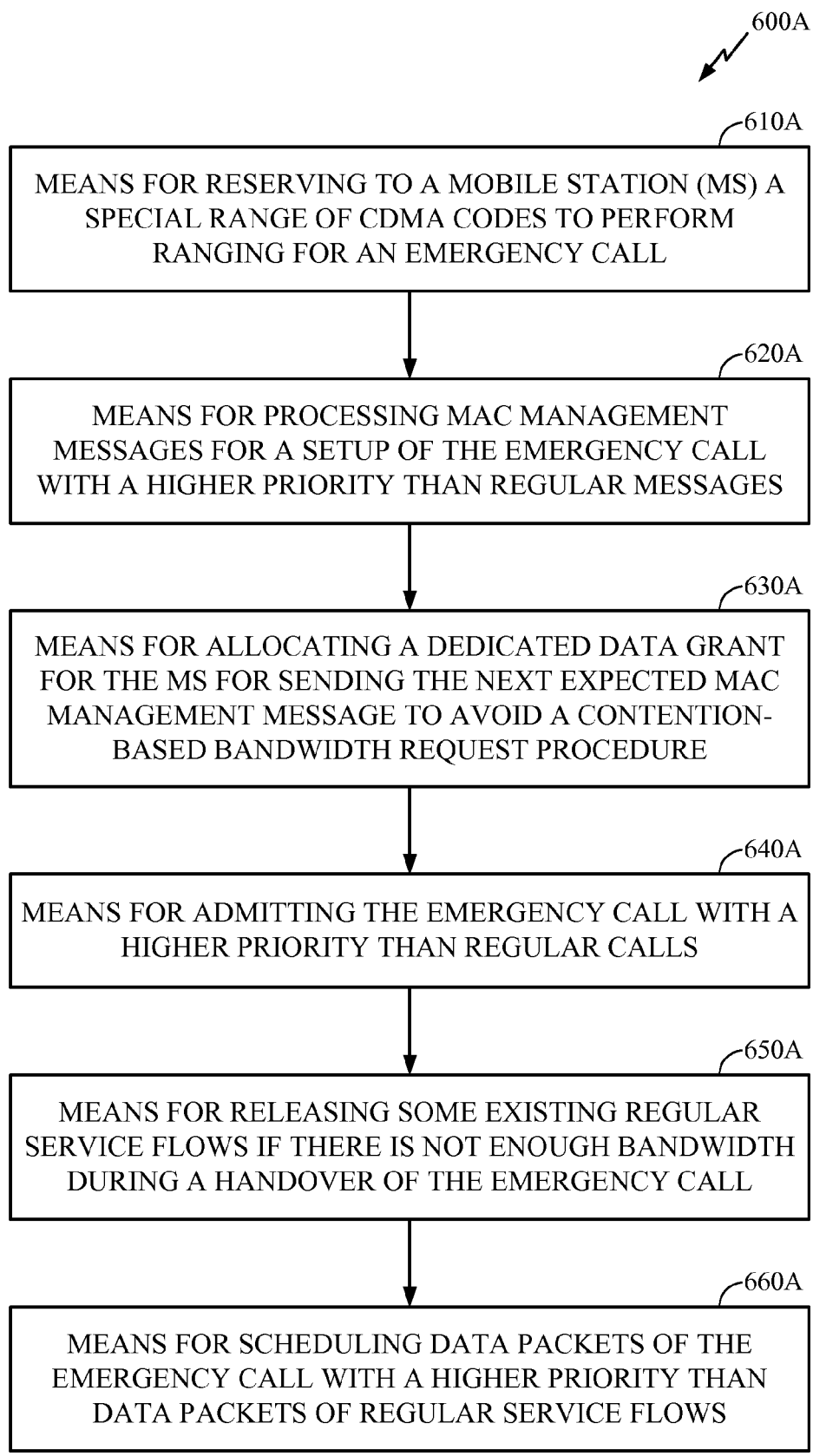
FIG. 6A illustrates example components capable of performing the operations illustrated in FIG. 6.

The various operations of methods described above may be performed by various hardware and/or software component(s) and/or module(s) corresponding to means-plus-function blocks illustrated in the Figures. For example, blocks 410-440 illustrated in FIG. 4 correspond to means-plus-function blocks 410A-440A illustrated in FIG. 4A. Similarly, blocks 510-560 illustrated in FIG. 5 correspond to means-plus-function blocks 510A-560A illustrated in FIG. 5A. Similarly, blocks 610-660 illustrated in FIG. 6 correspond to means-plus-function blocks 610A-660A illustrated in FIG. 6A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described herein may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications by a mobile station (MS), comprising:
   transmitting a ranging request message containing an emergency call identification provided in a ranging purpose indicator field to set up, with a first base station, an emergency call associated with the emergency call identification;
   transmitting Global Positioning System (GPS) location information to the first base station for use in determining a location of the emergency call;
   performing a ranging procedure for the emergency call by sending Code Division Multiple Access ranging codes with higher transmission power in the ranging procedure for the emergency call than in a ranging procedure for a non-emergency call, wherein the ranging procedure for the emergency call is performed faster than the ranging procedure for the non-emergency call;
   receiving instructions to perform a handover of the emergency call from the first base station to a second base station; and
   when there are not enough bandwidth resources to handover all existing services, releasing, before the handover, a service different from the emergency call.

2. The method of claim 1 further comprising:
   receiving, from the first base station, a paging message before setting up the emergency call if the MS is in an idle mode; and
   receiving, from the first base station, a Dynamic Service Addition (DSA) if the MS does not have a traffic connection.

3. The method of claim 1, further comprising:
   initiating the emergency call through a data call with a Quality of Service (QoS) emergency call parameter.

4. The method of claim 1, wherein setting up the emergency call bypasses an authentication procedure.

5. The method of claim 1, wherein the MS is not registered with any serving base station.

6. The method of claim 1, further comprising:
   receiving, from the first base station, an initial GPS location request; and
   receiving, from the first base station, periodic GPS location requests.

7. The method of claim 1 further comprising:
   transmitting GPS location information to the first base station after performing the ranging procedure with the first base station.

8. The method of claim 1 further comprising:
using a special range of Code Division Multiple Access codes when performing the ranging procedure for the emergency call;
transmitting Media Access Control (MAC) management messages for setting up the emergency call with a higher priority than for processing regular messages;
using a dedicated data grant to send a next expected MAC management message, the dedicated data grant being allocated by the first base station; and
receiving data packets of the emergency call, wherein the data packets of the emergency call are scheduled with a higher priority than data packets of other regular service flows.

9. The method of claim 1, wherein the emergency call is admitted with a higher priority than the non-emergency call.

10. An apparatus of wireless communications, comprising:
logic for transmitting a ranging request message containing an emergency call identification provided in a ranging purpose indicator field to set up, with a first base station, an emergency call associated with the emergency call identification;
logic for transmitting Global Positioning System (GPS) location information to the first base station for use in determining a location of the emergency call;
logic for performing a ranging procedure for the emergency call by sending Code Division Multiple Access ranging codes with higher transmission power in the ranging procedure for the emergency call than in a ranging procedure for a non-emergency call, wherein the ranging procedure for the emergency call is performed faster than the ranging procedure for the non-emergency call;
logic for receiving instructions to perform a handover of the emergency call from the first base station to a second base station; and
logic for releasing, before the handover, a service different from the emergency call when there are not enough bandwidth resources to handover all existing services.

11. The apparatus of claim 10 further comprising:
logic for receiving, from the first base station, a paging message before setting up the emergency call if the apparatus is in an idle mode; and
logic for receiving, from the first base station, a Dynamic Service Addition (DSA) if the apparatus does not have a traffic connection.

12. The apparatus of claim 10, further comprising:
logic for initiating the emergency call through a data call with a Quality of Service (QoS) emergency call parameter.

13. The apparatus of claim 10, wherein the logic for setting up the emergency call comprises logic for bypassing an authentication procedure.

14. The apparatus of claim 10, wherein the apparatus is not registered with any serving base station.

15. The apparatus of claim 10, further comprising:
logic for receiving, from the first base station, an initial GPS location request; and
logic for receiving, from the first base station, periodic GPS location requests.

16. The apparatus of claim 10 further comprising:
logic for transmitting GPS location information after performing the ranging procedure with the first base station.

17. The apparatus of claim 10 further comprising:
logic for using a special range of Code Division Multiple Access (CDMA) codes when performing the ranging procedure for the emergency call;
logic for transmitting Media Access Control (MAC) management messages for setting up the emergency call with a higher priority than for processing regular messages;
logic for using a dedicated data grant to send a next expected MAC management message, the dedicated data grant being allocated by the first base station; and
logic for receiving data packets of the emergency call, wherein the data packets of the emergency call are scheduled with a higher priority than data packets of other regular service flows.

18. The apparatus of claim 10, wherein the emergency call is admitted with a higher priority than the non-emergency call.

19. An apparatus of wireless communications, comprising:
means for transmitting a ranging request message containing an emergency call identification provided in a ranging purpose indicator field to set up, with a first base station, an emergency call associated with the emergency call identification;
means for transmitting Global Positioning System (GPS) location information to the first base station for use in determining a location of the emergency call;
means for performing a ranging procedure for the emergency call by sending Code Division Multiple Access ranging codes with higher transmission power in the ranging procedure for the emergency call than in a ranging procedure for a non-emergency call, wherein the ranging procedure for the emergency call is performed faster than the ranging procedure for the non-emergency call;
means for receiving instructions to perform a handover of the emergency call from the first base station to a second base station; and
means for releasing, before the handover, a service different from the emergency call when there are not enough bandwidth resources to handover all existing services.

20. The apparatus of claim 19 further comprising:
means for receiving, from the first base station, a paging message before setting up the emergency call if the apparatus is in an idle mode; and
means for receiving, from the first base station, a Dynamic Service Addition (DSA) if the apparatus does not have a traffic connection.

21. The apparatus of claim 19, further comprising:
means for initiating the emergency call through a data call with a Quality of Service (QoS) emergency call parameter.

22. The apparatus of claim 19, wherein the means for setting up the emergency call comprises means for bypassing an authentication procedure.

23. The apparatus of claim 19, wherein the apparatus is not registered with any serving base station.

24. The apparatus of claim 19, further comprising:
means for receiving, from the first base station, an initial GPS location request; and
means for sending receiving, from the first base station, periodic GPS location requests.

25. The apparatus of claim 19 further comprising:
means for transmitting GPS location information to the first base station after performing the ranging procedure with the first base station.

26. The apparatus of claim 19 further comprising:
means for using a special range of Code Division Multiple Access (CDMA) codes when performing the ranging procedure for the emergency call;

means for transmitting Media Access Control (MAC) management messages for setting up the emergency call with a higher priority than for processing regular messages;

means for using a dedicated data grant for the MS to send a next expected MAC management message, the dedicated data grant being allocated by the first base station; and means for receiving data packets of the emergency call, wherein the data packets of the emergency call are scheduled with a higher priority than data packets of other regular service flows.

27. The apparatus of claim 19, wherein the emergency call is admitted with a higher priority than the non-emergency call.

28. A computer-program storage apparatus of wireless communications, comprising a memory having instructions stored thereon, the instructions being executable by one or more processors of a mobile station (MS) and the instructions comprising:

instructions for transmitting a ranging request message containing an emergency call identification provided in a ranging purpose indicator field to set up, with a first base station, an emergency call associated with the emergency call identification;

instructions for transmitting Global Positioning System (GPS) location information to the first base station for use in determining a location of the emergency call;

instructions for performing a ranging procedure for the emergency call by sending Code Division Multiple Access ranging codes with higher transmission power in the ranging procedure for the emergency call than in a ranging procedure for a non-emergency call, wherein the ranging procedure for the emergency call is performed faster than the ranging procedure for the non-emergency call;

instructions for receiving a handover message to perform a handover of the emergency call from the first base station to a second base station; and instructions for releasing, before the handover, a service different from the emergency call when there are not enough bandwidth resources to handover all existing services.

29. The computer-program storage apparatus of claim 28, wherein the instructions further comprise:

instructions for receiving, from the first base station, a paging message before setting up the emergency call if the MS is in an idle mode; and instructions for receiving, from the first base station, a Dynamic Service Addition (DSA) if the MS does not have a traffic connection.

30. The computer-program storage apparatus of claim 28, wherein the instructions further comprise:

instructions for initiating the emergency call through a data call with a Quality of Service (QoS) emergency call parameter.

31. The computer-program storage apparatus of claim 28, wherein the instructions for setting up the emergency call comprise instructions for bypassing an authentication procedure.

32. The computer-program storage apparatus of claim 28, wherein the MS is not registered with any serving base station.

33. The computer-program storage apparatus of claim 28, wherein the instructions further comprise:

instructions for receiving, from the first base station, an initial GPS location request; and instructions for receiving, from the first base station, periodic GPS location requests.

34. The computer-program storage apparatus of claim 28, wherein the instructions further comprise:

instructions for transmitting GPS location information to the first base station after performing the ranging procedure with the first base station.

35. The computer-program storage apparatus of claim 28, wherein the instructions further comprise:

instructions for using a special range of Code Division Multiple Access (CDMA) codes when performing the ranging procedure for the emergency call;

instructions for transmitting Media Access Control (MAC) management messages for setting up the emergency call with a higher priority than for processing regular messages;

instructions for using a dedicated data grant to send a next expected MAC management message, the dedicated data grant being allocated by the first base station; and instructions for receiving data packets of the emergency call, wherein the data packets of the emergency call are scheduled with a higher priority than data packets of other regular service flows.

36. The computer-program storage apparatus of claim 28, wherein the emergency call is admitted with a higher priority than the non-emergency call.

* * * * *